United States Patent
Sigg et al.

(10) Patent No.: US 8,059,557 B1
(45) Date of Patent: Nov. 15, 2011

(54) METHOD AND SYSTEM FOR ACCESS GATEWAY SELECTION

(75) Inventors: Jason P. Sigg, Olathe, KS (US); Ashish Bhan, Shawnee, KS (US); Maulik K. Shah, Overland Park, KS (US); Anil Singh, Leawood, KS (US); Jasinder Pal Singh, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 688 days.

(21) Appl. No.: 12/172,693

(22) Filed: Jul. 14, 2008

(51) Int. Cl.
H04W 24/00 (2009.01)

(52) U.S. Cl. .......................................... 370/252; 370/340

(58) Field of Classification Search .................. 370/252, 370/340
See application file for complete search history.

(56) References Cited

U.S. PATENT DOCUMENTS

| | | | |
|---|---|---|---|
| 6,834,050 B1 | 12/2004 | Madour et al. | |
| 6,956,846 B2 | 10/2005 | Lewis et al. | |
| 6,985,464 B2 | 1/2006 | Harper et al. | |
| 6,987,764 B2 | 1/2006 | Hsu | |
| 7,075,930 B1 | 7/2006 | Chen et al. | |
| 7,082,130 B2 | 7/2006 | Borella et al. | |
| 7,088,707 B2 | 8/2006 | Jeon | |
| 7,154,868 B1 | 12/2006 | Sharma et al. | |
| 7,193,985 B1 | 3/2007 | Lewis et al. | |
| 7,254,119 B2 | 8/2007 | Jiang et al. | |
| 7,295,511 B2 | 11/2007 | Sharma et al. | |
| 7,346,684 B2 | 3/2008 | Borella | |
| 2003/0123395 A1* | 7/2003 | Jeon | 370/252 |
| 2005/0025116 A1 | 2/2005 | Chen et al. | |
| 2005/0143087 A1 | 6/2005 | Touati et al. | |
| 2007/0189268 A1* | 8/2007 | Mitra et al. | 370/352 |
| 2009/0109959 A1* | 4/2009 | Elliott et al. | 370/352 |

OTHER PUBLICATIONS

3rd Generation Partnership Project 2 "3GPP2", Interoperability Specification (IOS) for cdma2 Access Network Interfaces—Part 3 Features (3G-IOSv5.1), 3GPP2.A.S0013-D, cover page-p. 158, Version 1.0, Jun. 2007.

3rd Generation Partnership Project 2 "3GPP2", Interoperability Specification (IOS) for cdma2 Access Network Interfaces—Part 3 Features (3G-IOSv5.1), 3GPP2.A.S0013-D, pp. 159-352, Version 1.0, Jun. 2007.

* cited by examiner

Primary Examiner — Melvin Marcelo

(57) ABSTRACT

Methods and systems are defined that support, in a radio access network, measuring the latency between the radio access network and each respective access gateway of a plurality of access gateways. From these measurements, a list of access gateways, rank ordered from lowest to highest latency, is created. If the radio access network receives an incoming call indication designating that an associated incoming call is latency-sensitive, the radio access network will preferably assign the incoming call to an access gateway that is one with a measured respective round trip latency less than or equal to a median measured respective round trip latency. Additionally, the radio access network maintains a profile for at least some wireless communication devices that use its services. When the radio access network receives an incoming call indication for a wireless communication device, the radio access network preferably determines, from the wireless communication device's profile, if the wireless communication device has a history of heavy network usage. If the wireless communication device has a history of heavy network usage, the radio access network preferably assigns the incoming call to an access gateway that is one with a measured respective round trip latency greater than or equal to the median measured respective round trip latency.

17 Claims, 4 Drawing Sheets

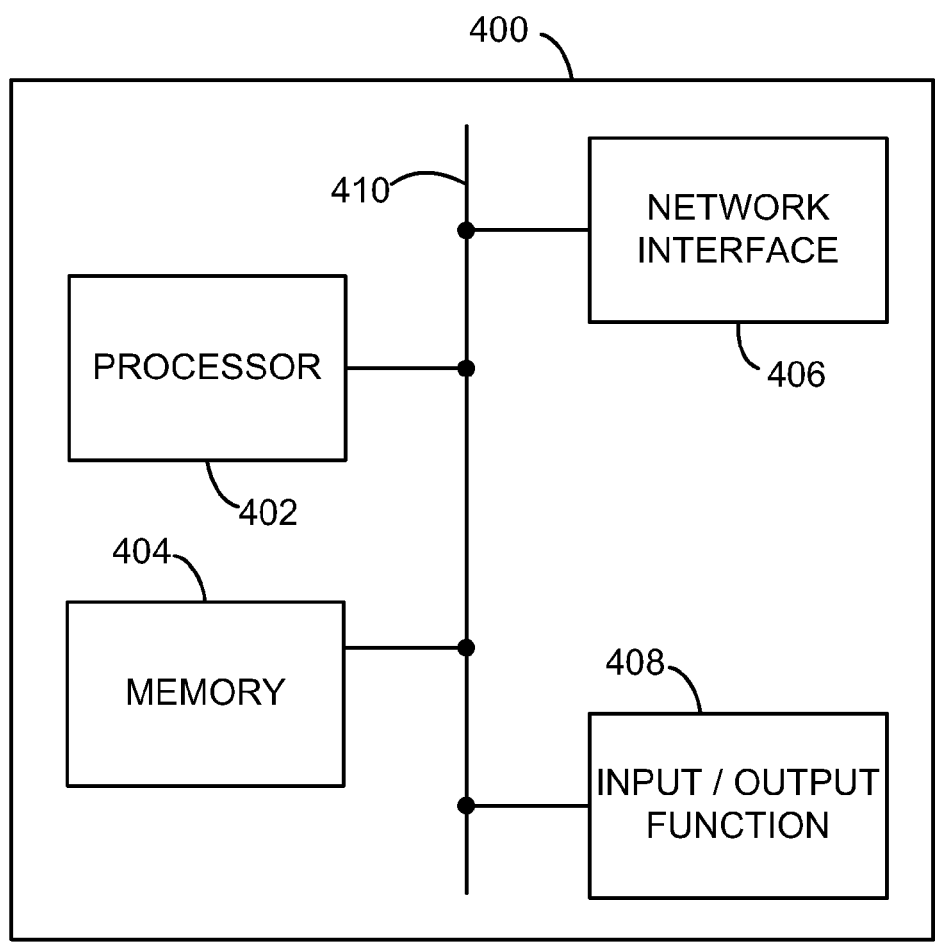

METHOD AND SYSTEM FOR ACCESS GATEWAY SELECTION

BACKGROUND

In a wireless communication system, it is desirable for the system to maintain a high quality of service. One aspect of quality of service is the latency, or latencies, experienced by subscribers as they perform various tasks, such as surfing the web, initiating a push-to-talk (PTT) session, or initiating a voice over Internet Protocol (VoIP) call. For instance, the latency associated with initiating a VoIP call might be measured from the time the subscriber presses a "talk" button on his or her wireless communication device (WCD), to the time that the subscriber hears an indication that the VoIP call is connected, such as a ringing tone. If a subscriber experiences latencies that are too high, the subscriber may become frustrated with the service, which could lead them to complain about the service or even cancel the service. In order to maintain and expand its customer base, an operator of a wireless communication system may try to minimize the latency experienced by subscribers as much as possible. As more traditionally circuit-switched applications, such as PTT and voice telephony, are ported to packet-switched data networks, the operator needs to carefully manage the resources of the data networks to ensure that the latencies experienced by subscribers do not have a deleterious impact on the subscribers' perception of the operator's service.

Many wireless access networks comprise a radio access network (RAN) and a core network. The RAN includes base transceiver stations (BTSs), base station controllers (BSCs) and other devices that allow wireless communication devices (WCDs) to benefit from wireless data access. The core network includes a plurality of access gateways and other devices that route and manage packet data traffic. A function of the RAN is to select an appropriate access gateway for each incoming call from a WCD.

One method of access gateway selection, as described in Section 3.17.3 of the Third Generation Partnership Project 2 (3GPP2) specification entitled, "Interoperability Specification (IOS) for cdma2000 Access Network Interfaces—Part 3 Features," is as follows. The RAN maintains a list of candidate access gateways. Each access gateway in the list is typically indexed by one of the access gateway's IP addresses. For an access gateway list with N entries, the entries are sorted in ascending order of their IP addresses, and then numbered 0 to N−1 according to this sorted order.

Each WCD is assigned an International Mobile Subscriber Identity (IMSI), which is a unique number associated with the WCD, typically taking the form of the WCD's phone number. When an incoming call from a WCD arrives, the RAN extracts the four least significant digits from the WCD's IMSI and performs a modulo N hash function on these digits. The resulting number, which will be an integer between 0 and N−1 inclusive, is used to index the list of IP addresses. The access gateway with the IP address associated with the integer is selected to serve the incoming call, and the incoming call is then routed from the WCD to that access gateway. If the RAN determines that an access gateway is non-responsive or if an access gateway transmits an error message to the RAN, the RAN may remove the access gateway from the list.

This method attempts to balance the number of WCDs assigned to each access gateway through the use of the hash function. However, in doing so, the RAN does not take into account the current latency, or any other performance factors, of each access gateway.

OVERVIEW

Disclosed herein are methods and systems for access gateway selection in a wireless communication network. Preferably, a RAN selects access gateways based on at least one access gateway performance metric such as latency. In order to facilitate this selection, the RAN may, from time to time, measure the round trip latency between it and each access gateway of a plurality of access gateways in the core network. From these measurements, the RAN can create a rank ordered list of access gateways based on their measured respective latencies. For example, this list could order the access gateways from lowest to highest according to their measured respective latencies.

A particular access gateway may be suffering from degraded service and performing some of its tasks, such as accepting incoming calls and routing packets to and from a WCD, more slowly than usual. However, as long as this degraded access gateway responds to each request from the RAN and does not transmit any error messages to the RAN, the RAN will continue to assign incoming calls to the degraded access gateway, even if other access gateways are not degraded. Thus, it is desirable for a RAN to be able to assign incoming calls to an access gateway based on some measure of the access gateway's current performance, such as latency.

Furthermore, as wireless networks become ubiquitous and exhibit speeds in the megabits per second, some subscribers will attempt to overuse the wireless communication service by uploading and downloading large volumes of data. In some wireless communication networks, for example, less than 5% of subscribers may account for over 40% of all bytes transferred by the network. While in a wireline network this sort of heavy use can congest routers and switches, in a wireless network, the impact of heavy use is more severe, because the RAN's capacity is shared by all WCDs in a given coverage area. Thus, one subscriber downloading a series of large files to his or her WCD can have a deleterious affect on the service to all other subscribers in the same wireless coverage area. Therefore, it is important for the operator to be able to discourage this sort of behavior. However, the method described above of assigning incoming calls to access gateways based on a hash function does not consider subscriber behavior when determining which access gateway should serve a WCD. This further motivates the desire for a RAN to be able to assign incoming calls to an access gateway based on a measure of the access gateway's current performance, such as latency.

Accordingly, in a first embodiment, the RAN uses the ordered list of access gateways to select an access gateway with a low measured respective round trip latency for incoming calls from at least some WCDs. For instance, the RAN may select the access gateway with the lowest measured respective round trip latency. Thus, the subscribers with WCDs assigned to these low-latency access gateways are likely to experience relatively low call initiation latencies. The decision to route an incoming call from a WCD to an access gateway may also be based on the type of call that the WCD is attempting to originate. If the RAN receives an indication that the incoming call is latency-sensitive, such as a PTT or a VoIP call for instance, the RAN may use this information to select an access gateway with a low measured latency.

In a second embodiment, the RAN may also store, or have access to, profiles associated with each respective WCD. Such a profile for a given WCD may include an indication of the given WCD's historical network usage information. For an incoming call from the given WCD, the RAN may use the contents of the given WCD's profile and the ordering of access gateways to select an access gateway for the WCD. In particular, if the WCD has exhibited heavy network usage in the past, the RAN may decide not to assign the WCD to an access gateway with low measured latency. This way, the WCD may receive a lower grade of service than WCDs with a history of reasonable network usage, and accordingly, heavy network usage is discouraged.

In both of the above embodiments, the list of candidate access gateways may change based on operator policy. For example, the operator may add access gateways to the list during traditional "busy hours" of the day, and the operator may remove access gateways from the list during times of day that traditionally exhibit low network usage. Modification of the list of access gateways can also be based on other operator-defined policies.

These and other aspects and advantages will become apparent to those of ordinary skill in the art by reading the following detailed description, with reference where appropriate to the accompanying drawings. Further, it should be understood that the foregoing overview is merely exemplary and is not intended to limit the scope of the invention as claimed.

BRIEF DESCRIPTION OF THE DRAWINGS

FIG. 4 is a schematic diagram of an exemplary RAN component in accordance with an exemplary embodiment.

DESCRIPTION

Disclosed herein are methods and systems for improving access gateway selection in radio access networks. For purposes of illustration, the discussion below is directed to a Code Division Multiple Access (CDMA) RAN and the associated access gateway is a packet data serving node (PDSN). It should be understood that any teachings of PDSN selection herein may apply to the selection of other types of access gateways, and that this illustration should not be construed as limiting the scope of the invention. Furthermore, this illustration should not be construed as limited to CDMA RANs, or any specific RAN configuration.

I. NETWORK ARCHITECTURE

Figure 1:
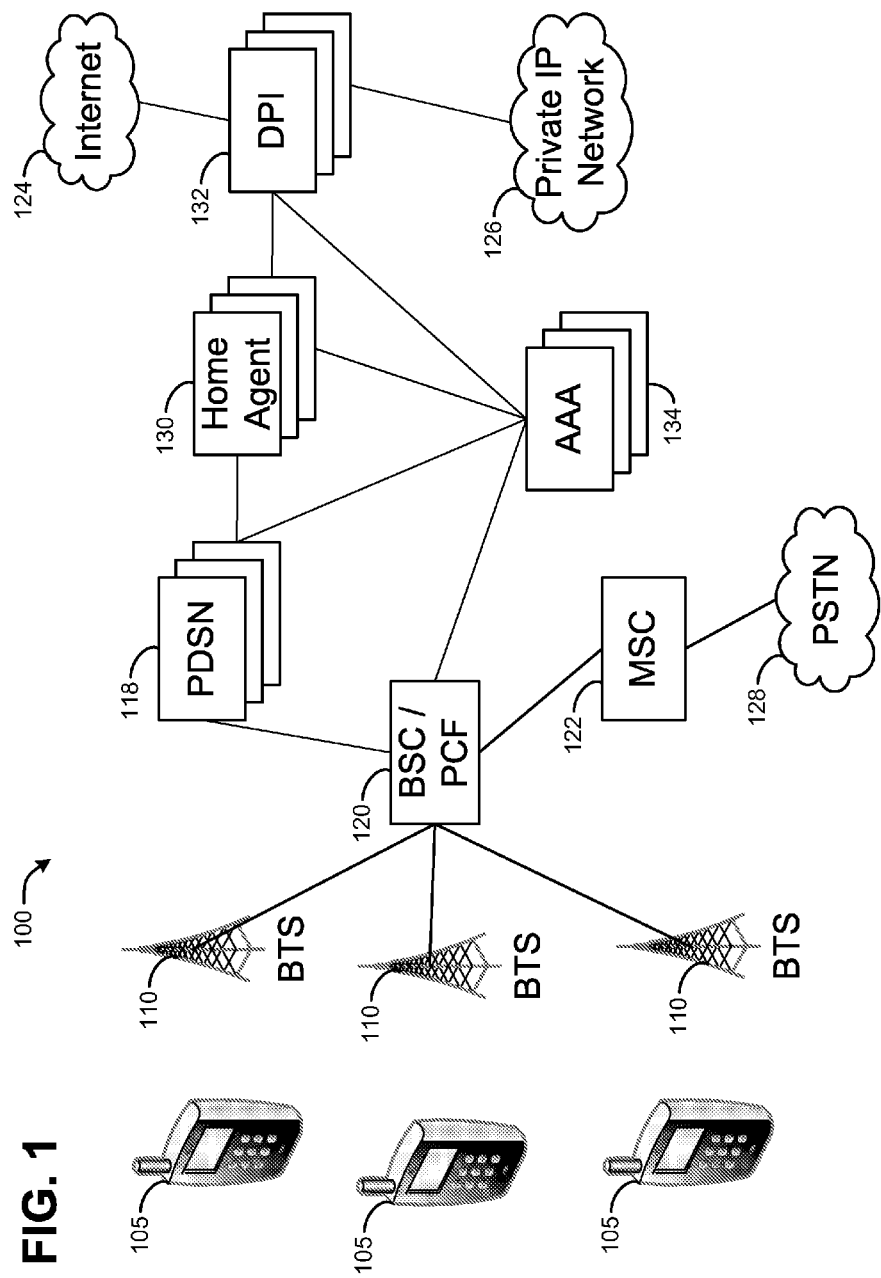
FIG. 1 is a block diagram of a communication network in accordance with an exemplary embodiment.

FIG. 1 is a simplified block diagram of an exemplary communication network 100, in which exemplary embodiments may be employed. Network 100 includes one or more WCDs 105, BTSs 110, base station controllers/packet control functions (BSCs/PCFs) 120, mobile switching centers (MSCs) 122, PDSNs 118, home agents (HAs) 130, authentication, authorization and accounting (AAA) 134 servers, and deep packet inspection functions (DPIs) 132. These components may connect in various ways to public switched telephone network (PSTN) 128, private IP network 126, and Internet 124. The combination of network elements including BTSs 110, BSC/PCF 120, and MSC 122 may be collectively referred to as a RAN. The combination of network elements including PDSNs 118, HAs 130, AAAs 134, and DPIs 132 may be referred to as core network components.

The components of FIG. 1 each include at least one processor, data storage in the form of memory, and program instructions stored in the memory and executable by the at least one processor to carry out the functions described herein. Furthermore, these components may operate in accordance with various types of wireless protocols, such as Code Division Multiple Access (CDMA), Worldwide Interoperability for Microwave Access (WIMAX), Universal Mobile Telecommunications System (UMTS), or other protocols now known or later developed. However, a RAN may also be defined to comprise more or fewer elements. Additionally, these components may be combined with one another; for example, a BTS 110 and a BSC/PCF 120 may be physically co-located or may be components of the same physical element.

The characteristics and functions of each of these devices are described at a high level in the following subsections. However, the descriptions in these subsections are merely introductory and should not be interpreted to limit the characteristics and functions of these devices.

a. BTS

BTSs 110 radiate to define wireless coverage areas. Each wireless coverage area may provide air interface access to WCDs 105 and any other wireless communication devices served by the wireless coverage area. A single BTS 110 may define one or more wireless coverage areas. The air interface may include forward links for transmitting information from a BTS 110 to WCDs 105 (in the forward direction) and reverse links for transmitting information from WCDs 105 to a BTS 110 (in the reverse direction). BTSs 110 and WCDs 105 exchange signaling, voice, data, video, or other media through the forward and reverse links. Although FIG. 1 shows only three BTSs 110, network 100 may include fewer or more than three BTSs 110.

b. WCD

WCDs 105 could be wireless telephones, wireless personal digital assistants, wirelessly equipped laptop computers, wireless routers, or other types of mobile or fixed wireless devices. Preferably, a WCD is a subscriber device, which is manipulated by a human in order to establish circuit-based or packet-based voice and/or data calls into the RAN and core network. However WCD 105 could also be an automated device without a human interface. Typically a WCD 105 is associated with one or more BTSs 110 at a time and uses the wireless coverage areas of these BTSs to communicate with correspondent nodes, such as web servers, gaming servers, VoIP signaling proxies, VoIP bearer gateways, and other WCDs 105. WCDs 105 may also be able to transfer ongoing communication sessions from one BTS 110 to another in a handoff process.

c. BSC/PCF

A BSC/PCF 120 comprises two logical devices, a BSC and a PCF, which are combined in FIG. 1 for purposes of simplicity. In a deployment of network 100, the BSC and PCF may be separate physical devices or may be software elements on the same physical device.

The BSC portion of BSC/PCF 120 may control multiple BTSs 110 by determining how each BTS 110 manages the WCDs 105 in the BTS's wireless coverage areas. For example, a BSC may instruct a BTS 110 to assign wireless channels to a WCD 105, increase or decrease power to a WCD 105, or handoff a WCD 105 to a different BTS 110. Voice and data traffic to and from each WCD 105 flows through a BSC. Preferably, the BSC routes circuit-switched communications to an MSC 122 and packet-switched communications to a PDSN 118. A BSC may, alone or in conjunction with AAA server 134, authenticate WCDs 105 that request RAN services.

When present, the PCF portion of the BSC/PCF 120 is preferably the RAN's interface to PDSNs 118. A PCF relays a WCD's packets between the RAN and the WCD's assigned PDSN 118. The PCF maintains a list of candidate PDSNs 118 to which an incoming call from a WCD 105 can be assigned, and the PCF selects a PDSN 118 from this list for each incoming call. In other arrangements, another entity may carry out some or all of these functions.

d. MSC

An MSC 112 performs many of the functions of a Class 5 telephony switch, but with additional functionality to manage the mobility of the end-subscriber devices, such as WCDs 105. For example, an MSC 112 may comprise a visitor location register (VLR) and a home location register (HLR), and may facilitate short message service (SMS) functions. In general, the MSC 122, is responsible for switching functions, media transport functions, and managing the communications between WCDs 105 and the PSTN 128.

e. PDSN

A PDSN 118 may be a router-like device that manages the connectivity of WCDs 105 to a packet-switched network. A PDSN 118 preferably serves tens, hundreds or thousands of WCDs 105 via point to point protocol (PPP) links to each WCD 105. However, a PPP link to a WCD 105 is not required for a PDSN 118 to serve a WCD 105. A PDSN 118 may also authenticate WCDs 105, or, in conjunction with AAA server 134, facilitate authentication of WCDs 105. Once a WCD 105 is authenticated, its serving PDSN 118 will grant the WCD 105 access to Internet 124 and/or public IP network 126.

PDSNs 118 may either connect directly to Internet 124 and/or public IP network 126, and/or may serve as a mobile IP foreign agent, and connect to these packet-switched networks through an HA 130. If the PDSN 118 connects directly to a packet-switched network, then preferably the PDSN 118 performs typical remote access functions, such as assigning a home IP address, next-hop gateway IP address, and DNS server IP addresses to each WCD 105 that the PDSN 118 serves. If the PDSN 118 instead serves as a foreign agent, then an HA 130 may perform some, or all, of these remote access functions.

f. HA

An HA 130 is preferably an anchor point for WCDs 105 that support mobile IP. As is described in Internet Request for Comments (RFC) 2002, "IP Mobility Support for IPv4," incorporated by reference herein, mobile IP is a well known network protocol that facilitates a WCD 105 roaming between multiple foreign agents by having an HA 130 assign an IP address to the WCD 105. (In network 100, the foreign agents are preferably PDSNs 118, but may be other devices in network 100 or other devices not shown.) Thus, as a WCD 105 changes its point of attachment to a network, the WCD 105 is able to maintain the same IP address. Preferably, all traffic between a WCD 105 and Internet 124 or public IP network 126 passes through the HA 130 that anchors the WCD 105. An HA 130 may also authenticate WCDs 105, or, in conjunction with AAA server 134, facilitate authentication of WCDs 105. Once a WCD 105 is authenticated, an HA 130 will grant the WCD 105 access to Internet 124 and/or public IP network 126.

g. AAA Server

AAA server 134 is typically a device that maintains a profile for each WCD 105 registered with the operator of network 100. This profile may contain an indication of the identity of each WCD 105 and the WCD's subscriber. For example, a AAA server 134 profile for a given WCD 105 may include the WCD's hardware identifier, IMSI, username, password, as well as any other information, either general or specific to the given WCD 105. When a WCD 105 attempts to log on to a PDSN 118 or HA 130, the PDSN 118 or HA 130 may transmit an access-request message to AAA server 134. If AAA server 134 determines that the WCD 105 is authorized to use network 100 and that the WCD 105 has presented an indication of the proper credentials (e.g., username and password), AAA server 134 may transmit an access-response to the PDSN 118 or HA 130, thus allowing the WCD 105 to log on to network 100. The interface that PDSNs 118 and HAs 130 use to access AAA server 134 may be one of the well known network protocols RADIUS (see for example, Internet RFC 2865, "Remote Authentication Dial In Subscriber Service (RADIUS)," incorporated herein by reference) or DIAMETER (see for example, Internet RFC 3588, "Diameter Base Protocol," incorporated herein by reference), or a similar protocol.

AAA server 134 may also collect accounting information per WCD 105, typically from PDSNs 118, HAs 130, and DPIs 132. This accounting information may include the amount of data that network 100 has transferred on behalf of WCD 105. Thus, this accounting information may incorporate the number of bytes transmitted in the forward direction to the WCD 105, the number of bytes transmitted in the reverse direction by the WCD 105, the duration of the WCD's session with the RAN, information about the RAN's characteristics, and potentially other information as well.

The contents of a AAA profile may contain more information relating to each WCD 105 than is described here. Since the RADIUS and DIAMETER protocols are both extensible, virtually any type of information stored in a AAA profile can be passed between AAA server 134 and other network devices. The totality of the accounting information gathered by AAA server 134, or parts thereof, may be used to generate billing records for WCDs 105 that use the resources of network 100.

AAA server 134 may be divided, either physically or logically, into multiple entities. An access network AAA (AN-AAA) server typically resides in a RAN and serves to authenticate a WCD 105 for access to the RAN's services. As discussed below, an AN-AAA server may store a profile that indicates the network usage history of the WCD. A home AAA server is typically co-located with an HA 130, and maintains the full profiles associated with WCDs 105. A visited AAA server is typically co-located with one or more foreign agents, and is used by a foreign agent, such as a PDSN 118, as a proxy or broker service to a home AAA. It should be understood that not all networks require all of these types of AAA servers. Furthermore, the AN-AAA, visited AAA, and home AAA server functions may be combined into the same physical device or devices, or separated into distinct software components or physical devices.

h. DPI

DPI 132 function performs detailed analysis of the packets transmitted to and from each WCD 105. DPI 132 may be a physically distinct component or may be combined into PDSN 118, HA 130, or other network components. The purpose of DPI 132 is to allow the operator of network 100 to develop a usage profile for each WCD 105. Such a profile might be used to determine the volume of traffic associated with each WCD 105 or to determine the type of network applications and services used by each WCD 105. For example, DPI 132 may examine the IP packets sent by a WCD 105 to determine the correspondent node, and thus determine the Internet 124 or private IP network 126 sites visited by WCD 105. Further, DPI 132 may examine the Transmission Control Protocol (TCP) or User Datagram Protocol (UDP) port numbers in packets to determine the applications that each WCD 105 is using. Even further, DPI 132 may examine the application payload in packets to determine the data contents that each WCD 105 is sending or receiving.

DPI 132 may report the network usage of a WCD 105 in various ways. For example, DPI 132 may report the number of bytes transferred by the WCD 105 per remote IP address, per transport layer protocol, or per application. Additionally or alternatively, DPI 132 may report the WCD's network usage per transport layer session. For example, if the WCD transfers data on a particular TCP session, DPI 132 could report the source and destination IP address associated with the TCP session, the source and destination TCP port numbers associated with the session, when the TCP session began, when the TCP session ended, the number of bytes transferred on the session, and other information. Furthermore, DPI 132 might record key strings found inside of the packets transferred to or from a WCD 105, such as Uniform Resource Locators (URLs), file names, IP addresses, and so on.

By performing deep packet analysis with a device such as DPI 132, the operator of network 100 may be able to collect various types of information about the subscribers of network 100, such as popular destinations and services, and well as the interests of the WCDs' 105 subscribers. The latter may be used for purposes of marketing or advertising.

Furthermore, the information collected by the DPI 132 can be used for purposes of security and control. For example, the DPI 132 may be provisioned to scan packets and packet streams for patterns of bytes that indicate that a WCD 105 may be attempting to "hack" a network or system, or that may indicate that a WCD 105 is infected with a virus. The DPI 132 may then either (1) alert the network operator that the WCD 105 is potentially engaged in hostile behavior, or (2) drop all packets to and from the WCD 105, effectively, preventing the WCD 105 from communicating. Additionally, DPI 132 may be capable of detecting certain types of heavy network usage by a WCD 105, such as the use of file sharing applications (e.g., peer-to-peer applications) or when the WCD's data transfer volume exceeds a given threshold. Upon detecting these conditions, DPI 132 may alert the network operator that WCD 105 is engaged in heavy network usage, rate-limit WCD's traffic, lowering WCD's effective bit rate so that WCD 105 cannot consume a disproportionate amount of network 100 capacity, or perform other actions.

Preferably, DPI 132 reports each WCD's usage information to AAA server 134 via the RADIUS or DIAMETER protocols. In particular, if DPI 132 reports a WCD's usage information to an AN-AAA in a RAN, the RAN can then select, based on this usage information, a PDSN to assign to the WCD on subsequent calls. However, DPI 132 may report some or all WCD usage information to other network 100 devices, such as other devices within the RAN, and, in doing so, may use protocols other than RADIUS and DIAMETER.

II. MEASUREMENT OF ROUND TRIP LATENCY BETWEEN THE RAN AND PDSNS

In order to evaluate the performance of each of the PDSNs 118 available to the RAN, the RAN preferably measures the round trip latency between itself and each PDSN 118. These measurements can take various forms and can be executed according to various schedules. Preferably, the RAN measures round trip latency from a BSC/PCF 120 to each PDSN 118, but the RAN is not limited to using a BSC/PCF 120 for these measurements and may use other devices in the RAN instead.

A BSC/PCF 120 may use a ping application to measure round trip latency between it and PDSNs 118. As is known in the art, a first IP network device can use a ping application to measure round trip latency between it and a second IP network device by transmitting an Internet Control Message Protocol (IMCP) echo request message to the second IP network device. ICMP is a well-known network protocol defined in Internet RFC 792, "Internet Control Message Protocol," and is incorporated by reference herein. Preferably, the ICMP echo request message contains a unique identifier and a sequence number. The first IP network device records the unique identifier and sequence number along with a first timestamp containing the time at which the ICMP echo request was sent. Upon receiving an ICMP echo request, the second IP network device may copy the unique identifier and sequence number from the ICMP echo request into an ICMP echo reply message, and transmit the ICMP echo reply message to the first IP network device. Upon receiving the ICMP echo reply message, the first IP network device records the time at which the ICMP echo reply message was received in a second timestamp, and then compares the unique identifier and sequence number from the ICMP echo reply with the stored unique identifier and sequence number. If both of these values match, then the first IP network device subtracts the value of the first timestamp from the value of the second timestamp to determine the measured respective round trip latency between itself and the second IP network device.

However, using a ping application is only one method of measuring roundtrip latency. Other applications, including various types of TCP or UDP applications may be used instead of a ping application. Furthermore, the procedures for measuring roundtrip latency with timestamps, unique identifiers, and sequence numbers described above can be used with these other applications as well.

Regardless of the exact mechanism used to measure round trip latency between the RAN and PDSNs 118, it is preferable to repeat these measurements from time to time. For example, the RAN may schedule a roundtrip latency measurement to be performed to each PDSN 118 once every five minutes. Alternatively, the RAN may schedule these measurements to occur at different fixed intervals, at random intervals, or in response to various triggering events.

Preferably, the RAN stores the results of these measurements so that it can use them to determine which PDSNs 118 to assign to incoming calls from WCDs 105. The RAN may store more than one measurement per PDSN 118, and the RAN may assign calls to PDSNs 118 based on more than the most recent of these round trip latency measurements. For example, the RAN may store the most recent ten round trip latency measurements between it and each PDSN 118, and the determine which PDSN 118 to assign to incoming calls based on the averages of these measurements for each respective PDSN 118.

In addition to performing these measurements, the RAN may adjust the list of PDSNs 118 based on operator policy. An example of such an adjustment would be the RAN adding or removing PDSNs 118 from the list based on the time of day. During hours of the day that traditionally exhibit low network usage, the RAN may limit the PDSN 118 list to only PDSNs 118 that are in a particular area. However, during "busy hours" that traditionally exhibit high network usage, the RAN may expand the PDSN 118 list to include "overflow" PDSNs 118 from multiple areas. Thus, if the PDSNs 118 in a particular area become loaded, the RAN can route incoming calls to PDSNs 118 in a different area.

III. PDSN ASSIGNMENT

Presented below are methods for assigning incoming calls to PDSNs in accordance with preferred embodiments of the invention. These methods are for purposes of example. In each method, more or fewer steps may be used, and the steps may be carried out in a different order than is illustrated. Additionally, these methods may be combined with one another in multiple arrangements. However, preferred embodiments are not limited to these methods or any combination of these methods.

a. Latency-Sensitive Calls

Figure 2:
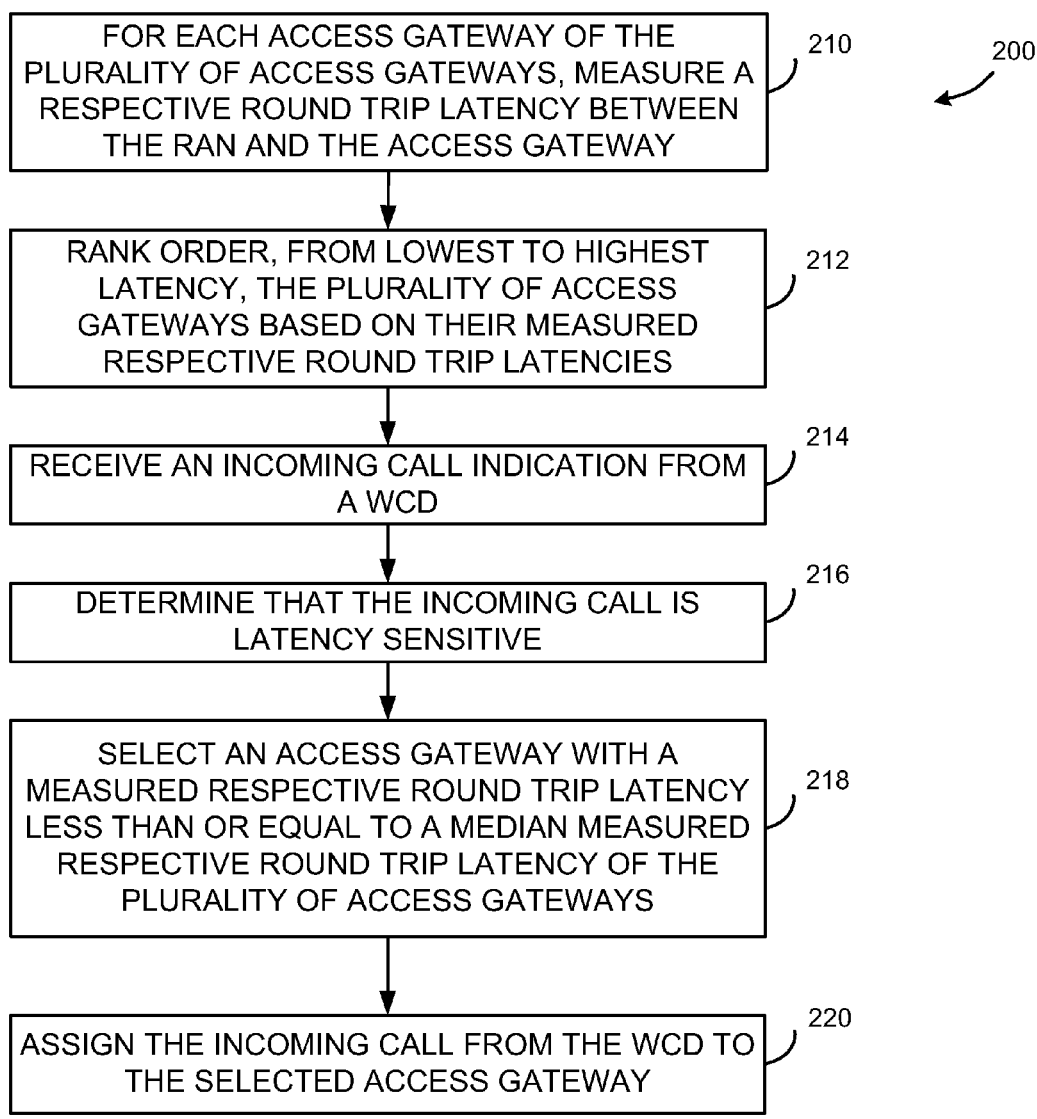
FIG. 2 is a flow chart depicting a method in accordance with an exemplary embodiment.

As discussed above, it is advantageous to assign latency-sensitive calls, such as PTT and VoIP calls, to PDSNs 118 (access gateways) that exhibit a low measured respective round trip latency. FIG. 2 illustrates a procedure for doing so in method 200.

At step 210, the respective round trip latency between the RAN and each access gateway of a plurality of access gateways is measured. These measurements are preferably performed according to the embodiments disclosed in the previous section. At step 212, the PDSNs 118 are rank ordered, from lowest to highest latency, based on their measured respective round trip latencies. For example, consider a system comprising four PDSNs 118, A, B, C, and D, with round trip latency measurements of 10 ms, 3 ms, 5 ms, and 120 ms, respectively. The RAN may rank the PDSNs 118 in the order of B, then C, then A, then D to indicate that PDSN 118 B has the lowest measured respective round trip latency, PDSN 118 C has the next lowest measured respective round trip latency, PDSN 118 A has the second highest measured respective round trip latency, and PDSN 118 D has the highest measured respective round trip latency. The RAN maintains this list of rank ordered of PDSNs, and may periodically update it with the results of new latency measurements. While the rank ordering of step 212 is a preferred mode of comparing the measured respective round trip latencies, other comparisons may be used instead.

The rank ordering performed in step 212, implicitly provides a means to calculate the median value of measured respective round trip latency. As is well known in the field of statistics, an ordered list of values exhibits a median value that is the value in the middle of the ordered list. If there is an odd number of values in the list, the median value is the value for which the number of values less than the median value is equivalent to the number of values greater than the median value. If there is an even number of values in the list, the mean (average) of the two middle-most values is the median value. Thus, for the example of PDSNs 118 A, B, C, and D above, the median value of measured respective round trip latency is 7.5 ms, the average of the measured respective round trip latencies of PDSN 118 C and PDSN 118 A.

In order to choose a PDSN in the rank ordered list with a measured respective round trip latency either above or below the median of these values, this median need not be explicitly calculated. Instead, the RAN may choose a PDSN below with a measured respective round trip latency greater than or equal to the median by choosing a PDSN in the half of the rank ordered list containing measured respective round trip latencies rank ordered greater than or equal to the median value. Similarly, the RAN may choose a PDSN with a measured respective round trip latency less than or equal to the median by choosing a PDSN in the half of the rank ordered list containing measured respective round trip latencies rank ordered less than or equal to the median value.

In a wireless communication network, before a WCD 105 initiates a call, the WCD will typically send an indication to the RAN that the WCD is requesting to make a call. At step 214, such an incoming call indication from a WCD 105 is received. This incoming call indication may include a designation that the associated incoming call is latency-sensitive. In a CDMA wireless communication network, each call may be associated with one or more service options, each of which designate the requirements of a logical communication session associated with the call. Thus, the designation in the incoming call indication may be a service option of a particular value. For instance, the WCD 105 might indicate a call type of PTT or VoIP with different service options than it would use to indicate a call type for a best effort data application.

Accordingly, at step 216, it is determined, preferably from the incoming call indication, that the incoming call is latency-sensitive. Alternatively, an incoming call can be determined to be latency-sensitive from other factors, such as an identifier of the WCD a profile of the WCD stored in the RAN or AAA server 134. At step 218, this determination is used to select a PDSN 118, from the rank ordering of PDSNs 118 established at step 212, with a measured respective round trip latency less than or equal to the median value of measured respective round trip latencies of these PDSNs 118. Thus, given the rank ordering of PDSNs 118 A, B, C, and D described above, the RAN would preferably choose a either PDSN 118 B or PDSN 118 C to assign to the incoming call. Accordingly, at step 220, the incoming call from the WCD 105 is assigned to the selected PDSN 118. The selection of PDSN 118 may be based on the measured respective round trip latency of the PDSNs 118, or may be based on measured respective round trip latency of the PDSNs 118 in combination with other factors, such as the number of calls on each PDSN 118, or memory or central processing unit (CPU) usage of each PDSN.

By allowing the RAN to select a PDSN 118 in this manner, the RAN is given, in networks with more than just a few PDSNs 118, the option to balance incoming latency-sensitive calls across multiple PDSNs 118 that all exhibit relatively low latencies. Alternatively, the RAN may choose the PDSN 118 with the lowest measured respective round trip latency to assign to incoming calls.

b. Subscribers with a History of Heavy Network Usage

A WCD's profile, stored in AAA server 134 or a similar device, may contain accounting information related to the WCD 105. This accounting information may be collected and/or aggregated from reports from PDSNs 118, HAs 130, DPIs 132, and other network entities. Thus, the WCD's profile may contain indications that the WCD 105 has made disproportionately heavy use of network capacity in the past. Types of disproportionately heavy network usage may include (1) use of one or more file sharing applications (for example, peer-to-peer applications such as Bittorrent or KAZAA that typical utilize large amounts of network capacity), or (2) exceeding a particular network usage threshold. It may be advantageous for the operator to avoid assigning the WCDs 105 of subscribers with a history of heavy network usage to PDSNs 118 with a low measured respective round trip latency, so that these subscribers do not interfere with subscribers of latency-sensitive applications. Furthermore, by assigning the WCDs 105 of subscribers with a history of heavy network usage to PDSNs 118 that exhibit a higher measured respective round trip latency, the loads on these PDSNs 118 may effectively throttle the data rates of the subscribers' WCDs 105.

Figure 3:
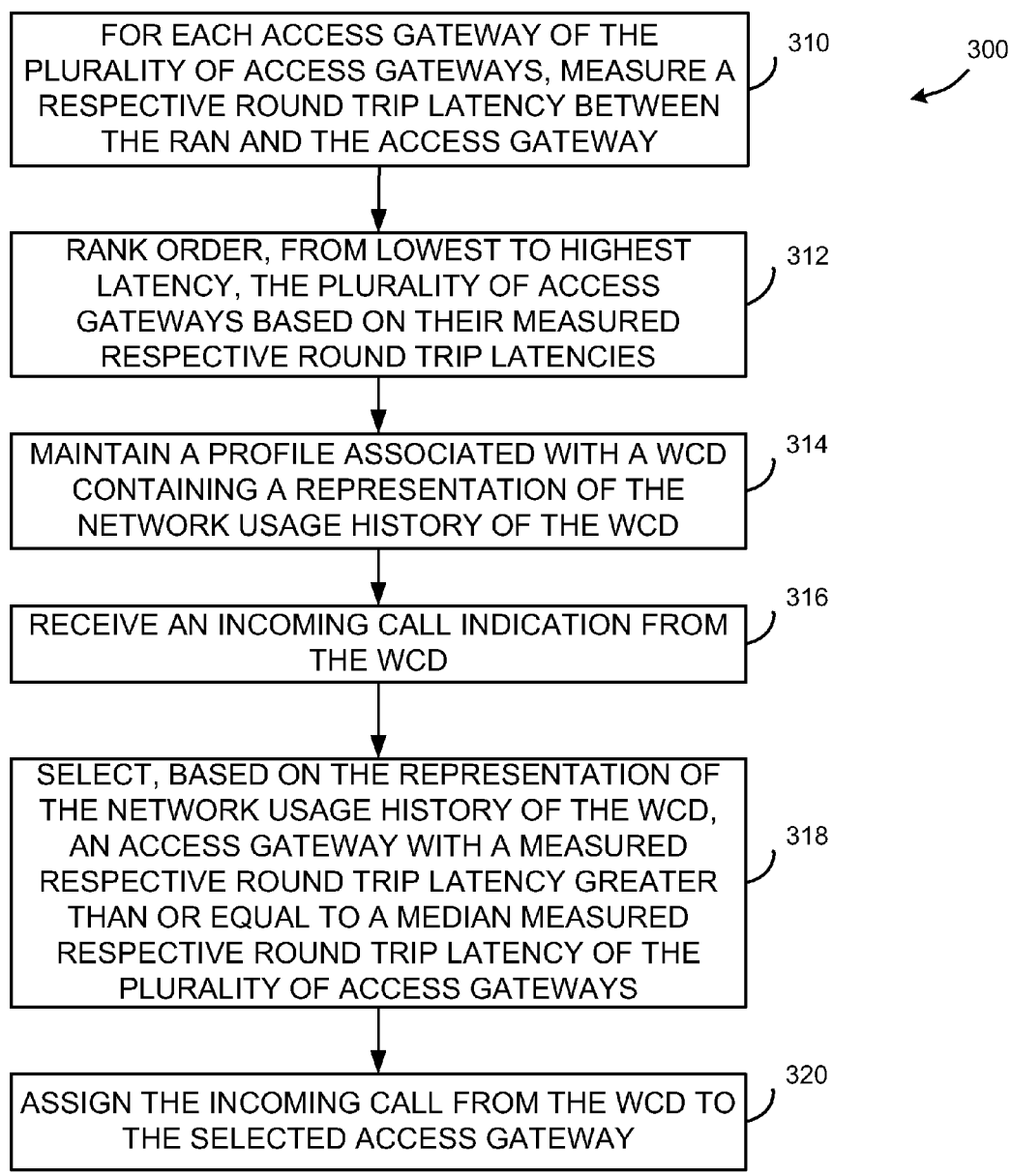
FIG. 3 is a flow chart depicting another method in accordance with an exemplary embodiment.

In FIG. 3, method 300 illustrates a procedure for assigning incoming calls from WCDs to PDSNs 118, using information from the WCDs' profiles. At step 310, the respective round trip latency between the RAN and each access gateway in a plurality of access gateways is measured. At step 312, the PDSNs 118 are rank ordered, from lowest to highest latency, based on their measured respective round trip latencies. While the rank ordering of step 312 is a preferred mode of comparing the measured respective round trip latencies, other comparisons may be used instead.

At step 314, a profile containing a representation of the network usage of the WCD is maintained. Accordingly, the profile may contain network usage information collected by AAA server 134, from one or more PDSNs 118, HAs 130, DPIs 132, or other entities. In addition to the various types of network usage information that a PDSN 118, HA 130, or DPI 132 could gather, the profile may include an indication that the WCD 105 has used one or more file sharing applications. Additionally, the profile may include a particular network usage threshold. Thus, the RAN can determine, from the profile's representation of network usage history of the WCD 105, if the WCD's network usage has exceeded the network usage threshold. For instance, the network operator may allow subscribers 5 gigabytes of data transfer per billing period. Once a WCD's profile reflects that the WCD 105 has exceeded this threshold, the WCD 105 may be categorized as exhibiting heavy network usage until the next billing period begins.

In the case that either the WCD 105 has used one or more file sharing applications or the WCD's network usage has exceeded the network usage threshold, the RAN may then determine that the WCD 105 has exhibited a history of heavy network usage. Of course, the WCD's profile may contain other indications of heavy network usage, and the RAN may use any of these or other indications, or any combination of these or other indications to determine that the WCD 105 has exhibited a history of heavy network usage.

In step 316, an incoming call indication is received from the WCD 105. At step 318, the RAN will preferably select, based on the representation of the network usage history of the WCD 105, a PDSN 118 with a measured respective round trip latency greater than or equal to the median value of measured respective round trip latencies of the PDSNs 118. Accordingly, at step 320, the incoming call from the WCD 105 is assigned to the selected PDSN 118.

IV. EXEMPLARY RAN COMPONENT

FIG. 4 is a simplified block diagram of an exemplary RAN component 400, illustrating some of the functional elements that would likely be found in a RAN component arranged to operate in accordance with the exemplary embodiment. Exemplary RAN component 400 could be a device in the RAN, such as BTS 110, BSC/PCF 120, or any other device that performs PDSN 118 selection. However, exemplary RAN component 400 can take other forms as well. Exemplary RAN component 400 preferably includes a processor 402, a memory 404, a network interface 406, and an input/output function 408, all of which may be coupled by a system bus 410 or a similar mechanism.

Processor 402 preferably includes one or more processors, such as one or more general purpose processors and/or one or more dedicated processors (e.g., application specific integrated circuits (ASICs) or digital signal processors (DSPs), etc.) Memory 404, in turn, may comprise volatile and/or non-volatile memory and can be integrated in whole or in part with processor 402. Memory 404 preferably holds program instructions executable by processor 402, and data that is manipulated by these instructions, to carry out various logic functions described herein. (Alternatively, the logic functions can be defined by hardware, firmware, and/or any combination of hardware, firmware and software.)

Network interface 406 may take the form of a wireline connection, such as an Ethernet, Token Ring, or T1 carrier connection. Network interface 406 may also take the form of a wireless connection, such as IEEE 802.11 (Wife) or Bluetooth. However, other forms of physical layer connections and other types of standard or proprietary communication protocols may be used over network interface 406

Input/output function 408 facilitates user interaction with exemplary RAN component 400. Input/output function 408 may comprise multiple types of input devices, such as a keyboard, a mouse, a touch screen, and so on. Similarly, input/output function 408 may comprise multiple types of output devices, such as a monitor, printer, or one or more light emitting diodes (LEDs). Additionally or alternatively, exemplary RAN component 400 may support remote access from another device, via network interface 406 or via another interface (not shown), such an RS-232 port.

By way of example, the data in memory 404 will preferably include a rank ordered list of PDSNs 118 as well as a round trip latency associated with each PDSN 118 in the list. The program instructions in memory 404 will preferably define logic for supporting IP communication protocols over network interface 406. Using IP communication protocols, the program instructions may define logic to support a roundtrip latency measurement routine that is invoked from time to time to measure the roundtrip latency between exemplary RAN component 400 and each PDSN 118 in the list of PDSNs 118. These program instructions also preferably define logic to update the round trip latency associated with each PDSN 118 based on these measurements. Additionally, the program instructions in memory 404 will preferably define logic for rank ordering, from lowest to highest latency, the PDSNs 118 in the list of PDSNs 118, based on their respective measured respective roundtrip latencies.

The program instructions in memory 404 also preferably define logic for PDSN 118 selection according to a first embodiment. For instance, the program instructions may define logic for (1) receiving an incoming call indication from a WCD 105, (2) determining that the associated incoming call from the WCD 105 is latency-sensitive, (3) selecting a PDSN 118, from the rank ordering of PDSNs 118 in memory 404, with a measured respective round trip latency less than or equal to the median value of measured respective round trip latencies of these PDSNs 118, and (4) assigning the incoming call from the WCD 105 to the selected PDSN 118.

Finally, the program instructions in memory 404 also preferably define logic for PDSN 118 selection according to a second embodiment. For instance, the program instructions may define logic for (1) receiving an incoming call indication from a WCD 105, (2) determining, from a profile of the WCD 105 stored in memory 404 that the WCD 105 has a history of heavy network usage, (3) selecting a PDSN 118 with a measured respective round trip latency greater than or equal to the median value of measured respective round trip latencies of the PDSNs 118, and (4) assigning the incoming call from the WCD 105 to the selected PDSN 118.

V. CONCLUSION

Exemplary embodiments have been described above. Those skilled in the art will understand, however, that changes and modifications may be made to these embodiments without departing from the true scope and spirit of the invention, which is defined by the claims.

What is claimed is:

1. A method performed by a radio access network (RAN), wherein the RAN comprises a base transceiver station (BTS), wherein the RAN selects an access gateway to serve a wireless communication device (WCD), and wherein the RAN maintains a profile associated with the WCD containing a representation of network usage history of the WCD, the method comprising:
   for each access gateway of a plurality of access gateways, measuring a respective round trip latency between the RAN and the access gateway;
   performing a comparison of the measured respective round trip latencies, wherein performing the comparison comprises rank ordering, from lowest to highest latency, the plurality of access gateways based on their measured respective round trip latencies;
   receiving, at the BTS, an incoming call indication from the WCD associated with an incoming call from the WCD;
   based at least on the comparison of the measured respective round trip latencies and the representation of network usage history of the WCD, selecting as the access gateway one of the plurality of access gateways that has a measured respective round trip latency greater than or equal to a median measured respective round trip latency of the plurality of access gateways; and
   assigning the incoming call from the WCD to the selected access gateway.

2. The method of claim 1, further comprising:
   receiving a second incoming call indication associated with a second incoming call from a second WCD, including a designation that the second incoming call from the second WCD is latency-sensitive;
   determining, from the designation, that the second incoming call from the second WCD is latency-sensitive;
   based on the determination that the second incoming call is latency-sensitive, selecting a second access gateway with a second measured respective round trip latency less than or equal to the median measured respective round trip latency of the plurality of access gateways; and
   assigning the second incoming call from the second WCD to the second access gateway.

3. The method of claim 2,
   wherein selecting the second access gateway further comprises selecting, as the second access gateway, one with a lowest measured respective round trip latency in the rank order.

4. The method of claim 1, wherein the incoming call from the WCD is a push to talk call.

5. The method of claim 1, wherein the incoming call from the WCD is a voice over internet protocol call.

6. The method of claim 1,
   wherein the representation of network usage history of the WCD indicates that the WCD has used at least one file sharing application, and
   wherein selecting the access gateway further comprises, based on the WCD's profile indicating that the WCD has used at least one file sharing application, selecting as the access gateway one with a measured respective round trip latency greater than or equal to a median measured respective round trip latency of the plurality of access gateways.

7. The method of claim 1,
   wherein the WCD's profile contains a network usage threshold, and
   wherein selecting the access gateway based on the representation of network usage history of the WCD comprises (i) determining, from the representation of network usage history of the WCD, that the WCD's network usage has exceeded the network usage threshold in the WCD's profile, and (ii) based on the determination, selecting as the access gateway one with a measured respective round trip latency greater than or equal to a median measured respective round trip latency of the plurality of access gateways.

8. The method of claim 1, further comprising:
   measuring the WCD's network usage at a deep packet inspection (DPI) function; and
   incorporating the measurements of the WCD's network usage from the DPI into the WCD's profile.

9. The method of claim 1, wherein measuring the respective round trip latency between the RAN and the access gateway comprises:
   making periodic measurements of the respective round trip latency between the RAN and the access gateway; and
   storing representations of the periodic measurements of the respective round trip latency between the RAN and the access gateway.

10. The method of claim 1, further comprising:
    determining, based on a time of day, access gateways to include in the plurality of access gateways.

11. The method of claim 1, wherein the RAN is in a communication network, wherein the communication network is of a type selected from the group consisting of a Code Division Multiple Access network, a Worldwide Interoperability for Microwave Access network, and a Universal Mobile Telecommunications System network.

12. A radio access network (RAN) comprising:
    a central processing unit (CPU);
    a memory storing a profile associated with a wireless communication device (WCD), the profile containing a representation of network usage history of the WCD;
    a base transceiver station (BTS) having at least one antenna radiating to define at least one wireless coverage area; and
    machine instructions stored in the memory and executable by the CPU to perform the steps of:
      for each access gateway of a plurality of access gateways, measuring a respective round trip latency between the RAN and the access gateway;
      storing, in the memory, representations of the measured respective round trip latencies;
      receiving, at the BTS, an incoming call indication from the WCD, wherein the incoming indication is associated with an incoming call from the WCD, and wherein the WCD uses the at least one wireless coverage area to communicate with the BTS;
      performing a comparison of the measured respective round trip latencies, wherein performing the comparison of the measured respective round trip latencies comprises rank ordering, from lowest to highest latency, the plurality of access gateways based on their measured respective round trip latencies;
      based at least on the comparison of the measured respective round trip latencies and the representation of network usage history of the WCD, selecting an access gateway with a measured respective round trip latency greater than or equal to a median measured respective round trip latency of the plurality of access gateways; and
      assigning the incoming call from the WCD to the selected access gateway.

13. The RAN of claim 12, wherein the machine instructions are further executable by the CPU to perform the steps of:
    receiving a second incoming call indication, associated with a second incoming call from a second WCD, including a designation that the second incoming call from the second WCD is latency-sensitive;
    determining, from the designation, that the second incoming call from the second WCD is latency-sensitive;
    based on the determination that the second incoming call is latency-sensitive, selecting a second access gateway with a second measured respective round trip latency less than or equal to the median measured respective round trip latency of the plurality of access gateways; and
    assigning the second incoming call from the second WCD to the second access gateway.

14. The RAN of claim 12, wherein the machine instructions are further executable by the CPU to perform the steps of:
    receiving network usage measurements of the WCD from a deep packet inspection (DPI) function; and
    incorporating the network usage measurements from the DPI into the profile record for the WCD.

15. The RAN of claim 12,
    wherein the representation of network usage history of the WCD in the WCD's profile indicates that the WCD has used at least one file sharing application, and
    wherein selecting the access gateway further comprises selecting, based on the WCD's profile indicating that the WCD has used at least one file sharing application, as the access gateway one with a measured respective round trip latency greater than or equal to a median measured respective round trip latency of the plurality of access gateways.

16. The RAN of claim 12,
    wherein the WCD's profile contains a network usage threshold,
    wherein selecting the access gateway further comprises (i) determining, from the representation of network usage history of the WCD, that the WCD's network usage has exceeded the network usage threshold in the WCD's profile, and (ii) selecting, based on the determination, as the access gateway one with a measured respective round trip latency greater than or equal to a median measured respective round trip latency of the plurality of access gateways.

17. The RAN of claim 12, wherein the machine instructions are further executable by the CPU to perform the step of:
    determining, based on a time of day, access gateways to include in the plurality of access gateways.

* * * * *